US 12,166,807 B2

(12) United States Patent
Baijal et al.

(10) Patent No.: US 12,166,807 B2
(45) Date of Patent: Dec. 10, 2024

(54) SERVER FOR RENDERING A VIRTUAL WORLD IMAGE AND CONTROL METHOD THEREOF

(71) Applicant: SAMSUNG ELECTRONICS CO., LTD., Suwon-si (KR)

(72) Inventors: Anant Baijal, Suwon-si (KR); Seungki Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/100,669

(22) Filed: Jan. 24, 2023

(65) Prior Publication Data

US 2023/0224348 A1     Jul. 13, 2023

Related U.S. Application Data

(63) Continuation of application No. PCT/KR2022/015631, filed on Oct. 14, 2022.

(30) Foreign Application Priority Data

Jan. 12, 2022   (KR) .................. 10-2022-0004901
Apr. 14, 2022   (KR) .................. 10-2022-0046340

(51) Int. Cl.
    *H04L 65/613*       (2022.01)
    *G06T 19/00*       (2011.01)

(52) U.S. Cl.
    CPC .......... *H04L 65/613* (2022.05); *G06T 19/006* (2013.01)

(58) Field of Classification Search
    CPC .. H04L 65/613; H04L 65/1094; G06T 19/006
    See application file for complete search history.

(56) References Cited

U.S. PATENT DOCUMENTS

| 8,564,621 | B2 | 10/2013 | Branson et al. |
| 9,338,200 | B2 | 5/2016 | Park et al. |
| 9,726,896 | B2 | 8/2017 | Von und au Liechtenstein |
| 10,386,635 | B2 | 8/2019 | Moon et al. |

(Continued)

FOREIGN PATENT DOCUMENTS

| KR | 10-2011-0040639 A | 4/2011 |
| KR | 10-2016-0054840 A | 5/2016 |

(Continued)

OTHER PUBLICATIONS

Search Report (PCT/ISA/210) issued Jan. 25, 2023 by the International Searching Authority for International Patent Application No. PCT/KR2022/015631.

*Primary Examiner* — Tonia L Dollinger
*Assistant Examiner* — Joseph M Cousins
(74) *Attorney, Agent, or Firm* — Sughrue Mion, PLLC

(57) ABSTRACT

A server is provided. The server includes a communication interface and a processor. The processor renders a virtual world image including an avatar corresponding to a user; transmits the virtual world image to a user terminal device through the communication interface; based on receiving, from the user terminal device through the communication interface, a first user command to add a virtual display device to the virtual world image, renders the virtual world image on which content displayed on a display device corresponding to the virtual display device is displayed through the virtual display device.

20 Claims, 14 Drawing Sheets

(56) References Cited

U.S. PATENT DOCUMENTS

| | | |
|---|---|---|
| 10,796,488 B2 | 10/2020 | Lee et al. |
| 10,809,527 B2 | 10/2020 | Song et al. |
| 11,120,630 B2 | 9/2021 | Choi et al. |
| 2009/0243957 A1* | 10/2009 | Ni .................... G06F 3/04815 345/1.1 |
| 2012/0038667 A1* | 2/2012 | Branson ............... G06T 19/006 715/757 |
| 2013/0314421 A1 | 11/2013 | Kim |
| 2014/0103104 A1* | 4/2014 | Jover ................ H04L 65/1069 235/375 |
| 2016/0133052 A1 | 5/2016 | Choi et al. |
| 2016/0379591 A1* | 12/2016 | Oya .................... G06T 19/006 345/633 |
| 2018/0173404 A1* | 6/2018 | Smith .................... G06F 3/017 |
| 2018/0246326 A1 | 8/2018 | Moon et al. |
| 2018/0246328 A1 | 8/2018 | Song et al. |
| 2019/0050063 A1 | 2/2019 | Jeong et al. |
| 2019/0102947 A1 | 4/2019 | Lee et al. |
| 2019/0362560 A1 | 11/2019 | Choi et al. |
| 2021/0116960 A1* | 4/2021 | Wang .................. G02B 27/017 |
| 2023/0092103 A1* | 3/2023 | Puyol .................... G06F 3/011 715/205 |

FOREIGN PATENT DOCUMENTS

| | | |
|---|---|---|
| KR | 10-2018-0099155 A | 9/2018 |
| KR | 10-2018-0101047 A | 9/2018 |
| KR | 10-1923723 B1 | 11/2018 |
| KR | 10-2019-0018358 A | 2/2019 |
| KR | 10-2019-0037763 A | 4/2019 |
| KR | 10-2019-0056523 A | 5/2019 |
| KR | 10-2020-0075249 A | 6/2020 |
| KR | 10-2020-0121061 A | 10/2020 |
| KR | 10-2020-0145805 A | 12/2020 |

* cited by examiner

FIG. 6A
FIG. 6B
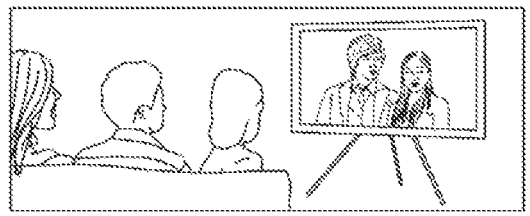
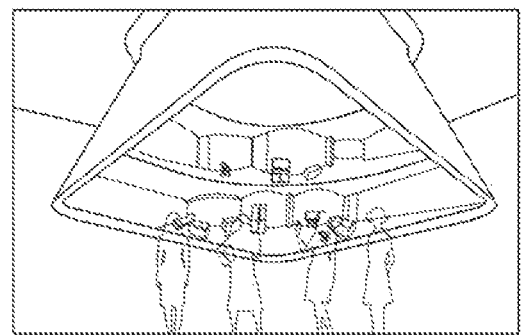
FIG. 6C   FIG. 6D   FIG. 6E
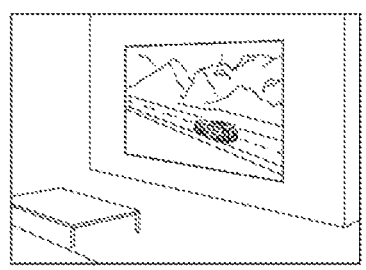 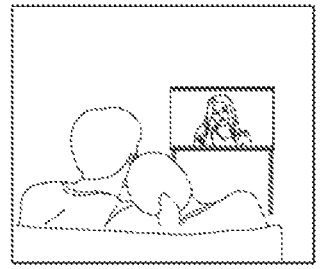 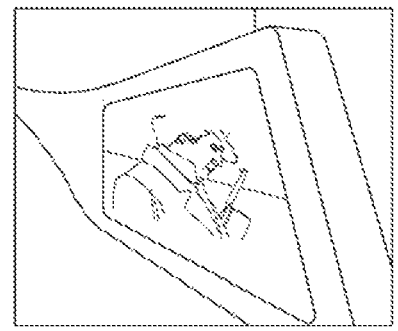

SERVER FOR RENDERING A VIRTUAL WORLD IMAGE AND CONTROL METHOD THEREOF

CROSS-REFERENCE TO RELATED APPLICATIONS

This application is a continuation of PCT/KR2022/015631, filed on Oct. 14, 2022, at the Korean Intellectual Property Receiving Office and claims priority under 35 U.S.C. § 119 to Korean Patent Application No. 10-2022-0004901, filed on Jan. 12, 2022 at the Korean Intellectual Property Office and to Korean Patent Application No. 10-2022-0046340, filed on Apr. 14, 2022 at the Korean Intellectual Property Office, the disclosures of each which are incorporated by reference herein in their entireties.

BACKGROUND

Field

The disclosure relates to a server for rendering a virtual world image, and a control method thereof.

Description of the Related Art

There is continuous demand for server-based real-time game services. In particular, recently, games have been developed in which a server builds a virtual world and each user provides a desired three-dimensional (3D) screen. The virtual world is called a metaverse, i.e., a virtual 3D world or a digital world, and may refer to a 3D virtual world in which social, economical, and cultural activities of the real world are carried out.

Specifically, the virtual world refers to a 3D virtual environment, which is similar to an actual environment and is created using computer graphic (CG) technology, so that a user is able to immerse himself or herself as a player in the virtual world through interactions using senses of the human body (e.g., sense of vision, sense of hearing, sense of taste, sense of smell, and sense of touch).

For example, a user may wear a head-mounted display (HMD) device, or the like, that provides virtual world services, and may play as a soldier in a virtual world created as a war environment or watch movies with a friend in a virtual world created as a theater.

Alternatively, the user may wear the HMD device, or the like, and evaluate content through a virtual display (VD) device in a virtual world. In this case, the content provided through the VD device may be content of a real display (RD) device of real world as shown in FIG. 1, but in the related art, it is difficult to allow two devices to work together.

That is, in the related art, there is a lack of functions of operating, controlling, sharing, interactions, etc. of a virtual display device in a virtual world, and furthermore, these functions are not compatible with attributes, functions, an application, settings, etc. of a display device in the real world.

Accordingly, there is for a technique for providing a user with a wide range of convenience in a virtual world.

SUMMARY

In accordance with an aspect of the disclosure, a server includes a communication interface, and a processor configured to render a virtual world image including an avatar corresponding to a user; transmit the virtual world image to a user terminal device through the communication interface; based on receiving, from the user terminal device through the communication interface, a first user command to add a virtual display device to the virtual world image, render the virtual world image on which content displayed on a display device corresponding to the virtual display device is displayed through the virtual display device.

The processor may be further configured to, based on receiving, from the user terminal device through the communication interface, a second user command of the avatar in relation to the virtual display device, control an operation of the virtual display device and transmit a control command corresponding to the second user command to the display device through the communication interface, based on the second user command.

The processor may be further configured to, based on an operation of the display device being changed and receiving information about the changed operation from the display device through the communication interface, render the virtual world image on the basis of the information about the changed operation.

The processor may be further configured to, based on the first user command and authentication information being received from the user terminal device through the communication interface, identify the display device corresponding to the virtual display device, based on the authentication information.

The processor may be further configured to: based on receiving a third user command to display other content from the user terminal device through the communication interface, render the virtual world image on which the other content is displayed through the virtual display device, and transmit a control signal for controlling the display device to display the other content to the display device through the communication interface; and based on receiving a command to stop sharing content and the third user command from the user terminal device through the communication interface, render the virtual world image on which the other content is displayed through the virtual display device.

The processor may be further configured to, based on a notification message being displayed on the display device while the content is displayed on the display device and the other content is displayed on the virtual display device, render the virtual world image on which the other content is overlaid with the notification message is displayed through the virtual display device.

The processor may be further configured to, based on receiving, from the user terminal device through the communication interface, a fourth user command to change a content playback mode between the user terminal device and the display device, render the virtual world image, based on a usage state of the user terminal device.

The processor may be further configured to render the virtual world image and provide the rendered virtual world image to the user terminal device through the communication interface based on determining that the user terminal device is in use by the user; and stop the rendering of the virtual world image based on determining that the user terminal device is not in use by the user.

The processor may be further configured to receive identification information and a playback position of the content based on determining that the user terminal device is in use by the user in a state in which the rendering of the virtual world image is stopped; and reproduce the content starting from the playback position, based on the identification information.

The processor may be further configured to, based on receiving the identification information and the playback position, transmit a control signal for turning off the display device to the display device through the communication interface.

The processor may be further configured to receive information about the virtual display device on which the content is displayed from another server through the communication interface; and render the virtual world image including the virtual display device, based on the received information.

In accordance with an aspect of the disclosure, a control method of a server includes rendering a virtual world image including an avatar corresponding to a user; transmitting the virtual world image to a user terminal device; and based on receiving, from the user terminal device, a first user command to add a virtual display device to the virtual world image, rendering the virtual world image on which content displayed on a display device corresponding to the virtual display device is displayed through the virtual display device.

The method may include, based on receiving, from the user terminal device, a second user command of the avatar in relation to the virtual display device, controlling an operation of the virtual display device on the basis of the second user command and transmitting a control command corresponding to the second user command to the display device.

The rendering of the virtual world image on which the content displayed on the display device corresponding to the virtual display device is displayed through the virtual display device may include: based on an operation of the display device being changed and receiving information about the changed operation from the display device, rendering the virtual world image on the basis of the information about the changed operation.

The rendering of the virtual world image on which the content displayed on the display device corresponding to the virtual display device is displayed through the virtual display device may include: based on the first user command and authentication information being received from the user terminal device, identifying the display device corresponding to the virtual display device on the basis of the authentication information.

In accordance with an aspect of the disclosure, a non-transitory computer readable storage medium having instructions stored thereon which, when executed by a processor of a server, causes the processor to: render a virtual world image including an avatar corresponding to a user; transmit the virtual world image to a user terminal device through a communication interface; based on receiving, from the user terminal device through the communication interface, a first user command to add a virtual display device to the virtual world image render the virtual world image on which content displayed on a display device corresponding to the virtual display device is displayed through the virtual display device.

Based on receiving, from the user terminal device through the communication interface, a second user command of the avatar in relation to the virtual display device, control an operation of the virtual display device and transmit a control command corresponding to the second user command to the display device through the communication interface, based on the second user command.

Based on an operation of the display device being changed and receiving information about the changed operation from the display device through the communication interface, render the virtual world image on the basis of the information about the changed operation.

Based on the first user command and authentication information being received from the user terminal device through the communication interface, identify the display device corresponding to the virtual display device, based on the authentication information.

Based on receiving a third user command to display other content from the user terminal device through the communication interface, render the virtual world image on which the other content is displayed through the virtual display device, and transmit a control signal for controlling the display device to display the other content to the display device through the communication interface; and based on receiving a command to stop sharing content and the third user command from the user terminal device through the communication interface, render the virtual world image on which the other content is displayed through the virtual display device.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIGS. 6A to 6E and 7 are diagrams illustrating various form factors of a virtual display device according to an embodiment;

DETAILED DESCRIPTION

Figure 1:
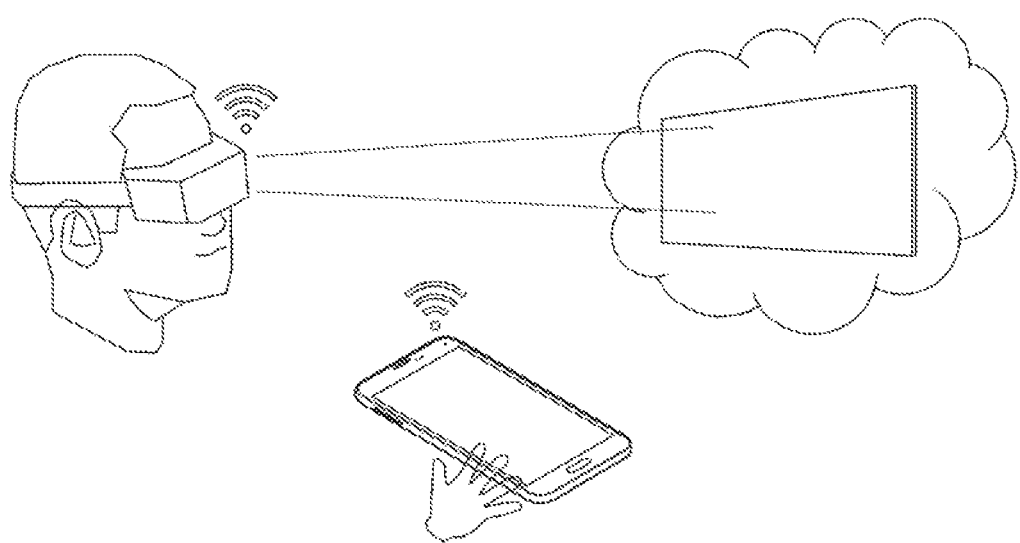
FIG. 1 is a diagram illustrating a related art a head-mounted display (HMD) device providing content of a real display (RD) device.

Embodiments of the present disclosure may be diversely modified. Accordingly, embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

To address the above-described need, the disclosure is directed to providing a server for allowing a display device of the real world and a virtual display device included in a virtual world to interwork, and a control method thereof.

Hereinafter, the disclosure will be described in detail with reference to the accompanying drawings.

In embodiments of the disclosure, general terms that have been widely used nowadays are selected, when possible, in consideration of functions of the disclosure, but non-general terms may be selected according to the intentions of technicians in this art, precedents, or new technologies, etc. In certain cases, some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

It should be understood that in the present specification, expressions such as "have", "may have", "include", or "may include" indicate the presence of features (e.g., a numerical value, a function, an operation or elements of a component) and do not exclude the presence of additional features.

An expression "at least one of A and/or B" should be understood to mean "A", "B" or "A and B".

In the present specification, expressions such as "first", "second", "primary" or "secondary" are used to modify various components regardless of order and/or importance and distinguish one component from another but are not intended to limit these expressions.

As used herein, the singular expressions are intended to include plural forms as well, unless the context clearly dictates otherwise. It should be understood that the terms "comprise," "comprising," "include," and/or "including," when used herein, specify the presence of stated features, integers, steps, operations, elements, components, or a combination thereof, but do not preclude the presence or addition of one or more features, integers, steps, operations, elements, components, or a combination thereof.

As used herein, the term "user" may refer to a human being or a device (e.g., an artificial intelligence electronic device) that uses an electronic device.

Hereinafter, various embodiments of the disclosure will be described in detail with reference to the accompanying drawings.

Figure 2:
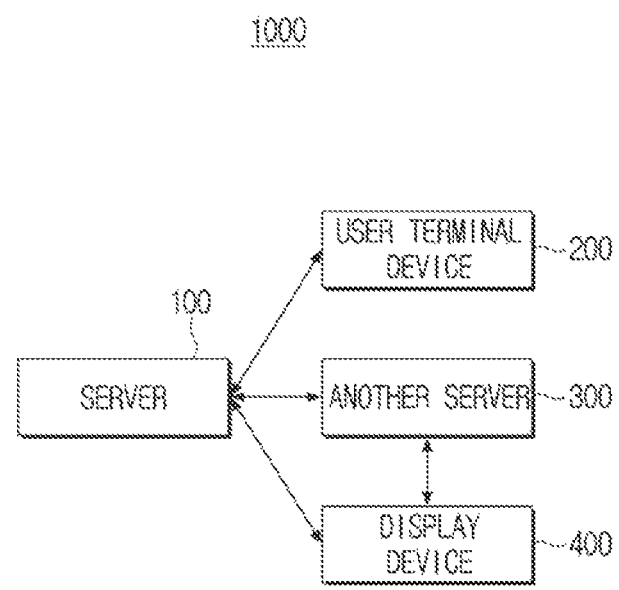
FIG. 2 is a block diagram of an electronic system, according to an embodiment.

FIG. 2 is a block diagram of an electronic system 1000, according to an embodiment. As shown in FIG. 2, the electronic system 1000 includes a server 100, a user terminal device 200, another server 300, and a display device 400.

The server 100 may render a virtual world image and provide the rendered virtual world image to the user terminal device 200. For example, the server 100 may real-time render a virtual world image, including all areas of a virtual world, and provide the user terminal device 200 with only an area corresponding to the user terminal device 200 in the rendered virtual world image. Here, the server 100 may identify only the area corresponding to the user terminal device 200 in the rendered virtual world image on the basis of the position of a user corresponding to the user terminal device 200 in the virtual world and the user's line of sight.

The server 100 may also render a virtual world including a virtual display device. In this case, the server 100 may receive content to be displayed on the virtual display device from the other server 300 or the display device 400. Alternatively, the server 100 may receive information about a virtual display device on which content is displayed from the other server 300. In this case, the server 100 may render a virtual world image including an object corresponding to the received information.

The user terminal device 200 is a device that provides a virtual world service and may be a head-mounted display (HMD) device. However, embodiments are not limited thereto, and the user terminal device 200 may be in the form of glasses, a headset, a helmet, or the like. Further, a form of the user terminal device 200 is not limited to these examples provided that the user terminal device 200 is a device capable of providing a virtual world service by providing images to a user's eyes. In addition, a type of the user terminal device 200 is not limited provided that the user terminal device 200 is a device, e.g., a smart phone, a laptop PC, or a desktop PC, that includes a display and is capable of providing virtual world services.

The user terminal device 200 may receive a rendered virtual world image from the server 100 and display the rendered virtual world image on a display. Here, the display may be embodied as an organic light-emitting diode (OLED), a light crystal display (LCD) panel but is not limited thereto. Alternatively, the display may be embodied as a flexible display, a transparent display, or the like.

The virtual world image may include a virtual display device, and the user terminal device 200 may display the virtual world image including the virtual display device. That is, a user may view the virtual world image including the virtual display device through the user terminal device 200. If the user's eyes do not look at the virtual display device when the user turns his or her head, the server 100 may transmit a virtual world image including no virtual display device to the user terminal device 200.

The user terminal device 200 may receive various types of user interactions through a user interface. A user command corresponding to a user interaction may be transmitted to the server 100. Here, an input from a keyboard or a mouse may be received through the user interface. Alternatively, the user interface may be embodied as a receiver for receiving a signal from a remote control device, a camera for detecting a user's motion, a microphone for receiving a user's voice, or the like.

The other server 300 may transmit content displayed on the display device 400 to the server 100 according to a request from the server 100. For example, the other server 300 may request the display device 400 to provide content, and transmit the content to the server 100 when the content is received from the display device 400. Alternatively, the other server 300 may request the display device 400 to provide content information, and transmit content corresponding to the content information to the server 100 when the content information is received from the display device 400. Alternatively, the other server 300 may request the display device 400 to provide content information, and transmit the content information to the server 100 when the content information is received from the display device 400. In this case, the server 100 may receive content corresponding to the content information directly from a content providing server.

However, embodiments are not limited thereto and the other server 300 may implement a virtual display through a virtual machine. In this case, the other server 300 may implement a virtual display device, which displays content, as an object and transmit the object to the server 100. In particular, the other server 300 may implement a plurality of virtual displays through a plurality of virtual machines. The server 100 may provide different types of content to not only the user terminal device 200 but also other user terminal devices.

The display device 400 is a device that provides content in the real world and may be a device, e.g., a TV, a desktop PC, a laptop computer, a smart phone, or a tablet PC, which includes a display. However, embodiments are not limited thereto, and the display device 400 may be a device, e.g., a set-top box (STB), which provides content to a display device, and a type of the display device 400, is not limited provided that the display device 400 is capable of providing content.

The display device 400 may transmit content or content information to the server 100 or the other server 300 in response to a request from the server 100 or the other server 300. In addition, the display device 400 may interwork with a virtual display device of the virtual world under control of the server 100.

Although for convenience of description, the server 100 and the other server 300 are described above as separate devices, the server 100 and the other server 300 may be embodied together as one device. However, for convenience of description, the server 100 and the other server 300 will be described as separate devices below.

Figure 3:
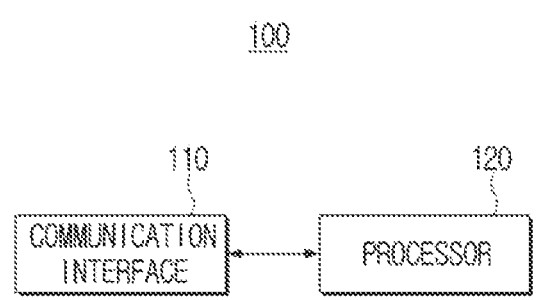
FIG. 3 is a block diagram of a server, according to an embodiment.

FIG. 3 is a block diagram of a server 100 according to an embodiment.

Referring to FIG. 3, the server 100 includes a communication interface 110 and a processor 120.

The communication interface 110 is configured to perform communication with various types of external devices according to various types of communication methods. For example, the server 100 may communicate with the user terminal device 200, the other server 300 through the communication interface 110.

The communication interface 110 may include a WiFi module, a Bluetooth module, an infrared communication module a wireless communication module, and the like. Here, each of the communication modules may be embodied as at least one hardware chip.

The Wi-Fi module and the Bluetooth module establish communication according to a WiFi method and a Bluetooth method, respectively. When the Wi-Fi module or the Bluetooth module is used, first, various types of connection information such as subsystem identification (SSID) and a session key may be transmitted or received, communication may be established using the various types of connection information, and various types of information may be transmitted or received. The infrared communication module performs communication according to Infrared Data Association (IrDA) technology for transmitting data wirelessly using infrared rays between visible light and a millimeter wave.

The wireless communication module may include at least one communication chip for establishing communication according to various wireless communication standards such as Zigbee, 3rd Generation (3G), 3rd Generation Partnership Project (3GPP), Long-Term Evolution (LTE), LTE Advanced (LTE-A), 4th Generation (4G), and 5th Generation (5G), as well as the above communication methods.

Alternatively, the communication interface 110 may include a wired communication interface such as HDMI, DP, Thunderbolt, USB, RGB, D-SUB, DVI, or the like.

In addition, the communication interface 110 may include at least one of a local area network (LAN) module, an Ethernet module, or a wired communication module for establishing communication using a pair cable, a coaxial cable or an optical fiber cable.

The processor 120 controls overall operations of the server 100. Specifically, the processor 120 may be connected to the components of the server 100 to control overall operations of the server 100. For example, the processor 120 may be connected to components such as the communication interface 110 and a memory to control operations of the server 100.

According to an embodiment, the processor 120 may be embodied as a digital signal processor (DSP), a microprocessor, or a time controller (TCON). However, the processor 120 is not limited thereto, and may include at least one of a central processing unit (CPU), a microcontroller unit (MCU), a microprocessing unit (MPU), a controller, an application processor (AP), a communication processor (CP), or an ARM processor or may be defined as a term corresponding thereto. Alternatively, the processor 120 may be embodied as a system-on-chip (SoC) or a large-scale integrated circuit (LSI) in which a processing algorithm is installed or as a field programmable gate array (FPGA).

The processor 120 may render a virtual world image including an avatar corresponding to a user and transmit the virtual world image to the user terminal device 200 through the communication interface 110.

When a first user command to add a virtual display device to a virtual world image is received from the user terminal device 200 through the communication interface 110, the processor 120 may render a virtual world image on which content displayed on the display device 400 corresponding to the virtual display device is displayed through the virtual display device.

For example, the server 100 may provide a virtual world image including a menu for adding a virtual display device corresponding to the display device 400. In addition, a user may input the first user command by selecting the menu through a user interface of the user terminal device 200. That is, information about the display device 400 may have been previously stored in the server 100.

Alternatively, a user may input the first user command through the user interface of the user terminal device 200, and the user terminal device 200 may transmit the first user command and the user's authentication information to the server 100. When the first user command and the authentication information are received from the user terminal device 200 through the communication interface 110, the processor 120 may identify the display device 400 corresponding to the virtual display device on the basis of the authentication information. That is, the information about the display device 400 may not be stored in the server 100.

Alternatively, the information about the display device 400 may not be stored in the server 100, and the processor 120 may receive only the first user command from the user terminal device 200 through the communication interface 110. In this case, the processor 120 may identify the display device 400 connected to the user terminal device 200 through the same access point (AP), and render a virtual world image on which content displayed on the identified display device 400 is displayed through the virtual display device.

The processor 120 may receive content and render a virtual world image on which the received content is displayed through the virtual display device. Alternatively, the other server 300 may render a virtual display device on which content is displayed, and the processor 120 may receive the rendered virtual display device and render a virtual world image including the rendered virtual display device. Although for convenience of description, one of the two methods will be described below, both of the two methods are available in this case.

When a second user command of an avatar in relation to a virtual display device is received from the user terminal device 200 through the communication interface 110, the processor 120 may control an operation of the virtual display device on the basis of the second user command and transmit a control command corresponding to the second user command to the display device 400 through the communication interface 110.

For example, when a second user command to increase brightness of the virtual display device is received from the user terminal device 200 through the communication interface 110, the processor 120 may render a virtual world image by increasing the brightness of the virtual display device on the basis of the second user command and transmit a control command to increase brightness of the display device 400 to the display device 400 through the communication interface 110.

Alternatively, when a second user command to change a channel of the virtual display device is received from the user terminal device 200 through the communication interface 110, the processor 120 may transmit the second user command to change the channel of the display device 400 and a command to provide content corresponding to the changed channel to the display device 400 through the communication interface 110. When the content corresponding to the changed channel is received from the display device 400 through the communication interface 110, the processor 120 may render a virtual world image on which the content corresponding to the changed channel is displayed through the virtual display device.

When an operation of the display device 400 is changed and information regarding the changed operation is received from the display device 400 through the communication interface 110, the processor 120 may render a virtual world image on the basis of the information regarding the changed operation.

When the brightness of the display device 400 is increased and information regarding the increased brightness is received from the display device 400 through the communication interface 110, the processor 120 may render a virtual world image to increase brightness of the virtual display device.

When a channel of the display device 400 is changed and content corresponding to the changed channel is received from the display device 400 through the communication interface 110, the processor 120 may render a virtual world image on which the content corresponding to the changed channel is displayed through the virtual display device.

However, embodiments are not limited thereto, and when the channel of the display device 400 is changed and the information about the changed channel is received from the display device 400 through the communication interface 110, the processor 120 may render a virtual world image on which content overlaid with a user interface (UI) inquiring whether to change a channel is displayed through a virtual display device. This is because a user who views the virtual display device and a user who views the display device 400 may be different from each other.

When a volume of the display device 400 is changed and information regarding the changed volume is received from the display device 400 through the communication interface 110, the processor 120 may render a virtual world image on which content, the volume of which is changed on the basis of the information regarding the changed volume is displayed through a virtual display device. Alternatively, when the volume of the display device 400 is changed and the information regarding the changed volume is received from the display device 400 through the communication interface 110, the processor 120 may transmit a control command to change the volume of the user terminal device 200 to the user terminal device 200 through the communication interface 110.

When a third user command to display other content is received from the user terminal device 200 through the communication interface 110, the processor 120 may render a virtual world image on which the other content is displayed through a virtual display device and transmit a control signal for controlling the display device 400 to display the other content to the display device 400 through the communication interface 110, and when a command to stop sharing content and the third user command are received from the user terminal device 200 through the communication interface 110, the processor 120 may render a virtual world image on which the other content is displayed through the virtual display device.

That is, the processor 120 may allow the virtual display device and the display device 400 to interwork when only the third user command is received, and may stop the interworking of the virtual display device and the display device 400 when the command to stop sharing content and the third user command are received.

However, embodiments are not limited thereto, and when the third user command to display the other content is received from the user terminal device 200 through communication interface 110, the processor 120 may render a virtual world image on which the other content overlaid with a UI inquiring whether to continue the interworking with the display device 400 is displayed through the virtual display device. In addition, the processor 120 may determine whether to transmit a control signal for controlling the display device 400 to display the other content on the basis of a user command regarding whether to continue the interworking with the display device 400.

When a notification message is displayed on the display device 400 while content is displayed on the display device 400 and other content is displayed on the virtual display device, the processor 120 may render a virtual world image on which the other content overlaid with the notification message is displayed through the virtual display device. That is, the notification message may be displayed even when the display device 400 and the virtual display device do not interwork.

When a fourth user command to change a content playback mode between the user terminal device 200 and the display device 400 is received from the user terminal device 200 through the communication interface, the processor 120 may render a virtual world image on the basis of a usage state of the user terminal device 200.

For example, the processor 120 may render a virtual world image and transmit the virtual world image to the user terminal device 200 through the communication interface 110 when it is determined that the user terminal device 200 is in use by a user, and stop rendering the virtual world image when it is determined that the user terminal device 200 is not in use by the user.

Here, when it is determined that the user terminal device 200 is in use by the user in a state in which the rendering of the virtual world image is stopped, the processor 120 may receive identification information and a playback position of content from the display device 400 and render the virtual world image by reproducing the content starting from the playback position on the basis of the identification information.

In addition, when the identification information and the playback position are received, the processor 120 may transmit a control signal for turning off the display device 400 to the display device 400 through the communication interface 110.

The processor 120 may receive information about a virtual display device that displays content from the other server 300 through the communication interface 110 and render a virtual world image including the virtual display device on the basis of the received information.

Alternatively, the processor 120 may directly implement a virtual display device that displays content and render a virtual world image including the virtual display device.

Through the above operation, it is possible to seamlessly provide content between the display device 400 and the virtual display device.

The server 100 may further include a memory. The memory may be hardware storing information such as data in an electrical or magnetic form so that the information is accessible by the processor 120, or the like. To this end, the memory may be embodied as at least one type of hardware among a nonvolatile memory, a volatile memory, a flash memory, a hard disk drive (HDD), a solid state drive (SSD), a random access memory (RAM), or a read-only memory (ROM).

The memory may store at least one instruction or module necessary to operate the server 100 or the processor 120. Here, the instruction is a coding unit for instructing an operation of the server 100 or the processor 120 and may be written in a machine language interpretable by a computer. The module may be a set of consecutive instructions for performing a certain task which is a work unit.

The memory may store data, which is information representing characters, numbers, images, etc., in units of bit or bytes. For example, content and information about the content may be stored in the memory.

The memory is accessible by the processor 120, and reading, recording, modifying, deleting, updating, or the like, of an instruction, a module or data may be performed by the processor 120.

As described above, the server 100 may control a display device of the real world according to a user command to control a virtual display device in a virtual world, thereby increasing user convenience.

That is, all operations of the virtual display device and the real display device may be linked. However, embodiments are not limited thereto and only some operations of the virtual display device and the actual display device may be linked with each other. For example, the virtual display device may provide attributes, settings, a control function, etc., that are not provided by a real display device, and in this case, an operation of the real display device may not change even when the attributes, settings, a control function, etc. of the virtual display device are changed.

An operation of the server 100 will be described in more detail with reference to FIGS. 4 to 13 below. In FIGS. 4 to 13, various embodiments will be described for convenience of description. However, the embodiments of FIGS. 4 to 13 may be implemented in combination.

Figure 4:
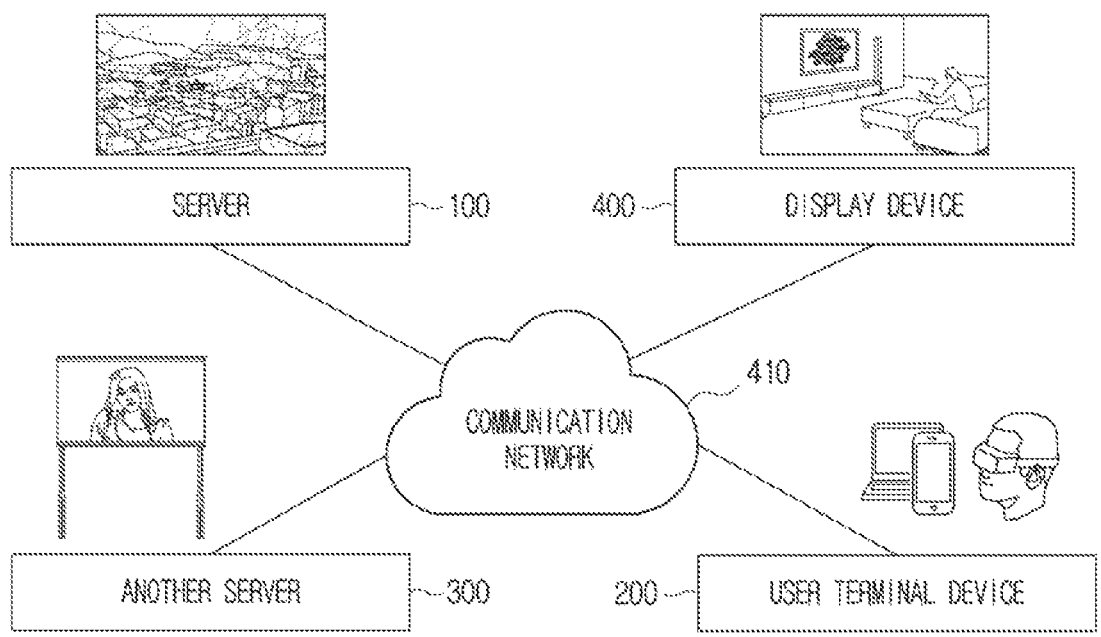
FIG. 4 is a diagram illustrating an electronic device according to an embodiment.

FIG. 4 is a diagram illustrating an electronic device 1000 according to an embodiment.

A server (e.g., virtual world server) 100 may render a virtual world image and transmit the rendered virtual world image to a user terminal device (virtual world client device) 200 through a communication network 410.

Another server 300 shown in a lower left part of FIG. 4 may implement a virtual display through a virtual machine. For example, the other server 300 may receive content or content information from a display device (e.g., real display client device) 400 shown in an upper right part of FIG. 4, and implement a virtual display through a virtual machine.

The server 100 may receive content or content information from the other server 300 and render a virtual world image on which the content is displayed through the virtual display.

Through the above-described operation, the virtual display device displayed on the user terminal device 200 and the display device 400 may interwork.

Although FIG. 4 illustrates only one user terminal device 200 and one display device 400, embodiments are not limited thereto. For example, the server 100 and the other server 300 may be connected to a plurality of user terminal devices and a plurality of display devices.

Alternatively, the server 100 and the other server 300 may be connected to one user terminal device 200 and a plurality of display devices. In this case, a user of the user terminal device 200 may select a display device to interwork from among a plurality of display devices. Alternatively, the user of the user terminal device 200 may change a display device to interwork among the plurality of display devices. Alternatively, the user may add a virtual display device. For example, a first virtual display device may interwork with a first display device among the plurality of display devices, and a second virtual display device may interwork with a second display device among the plurality of display devices.

Figure 5:
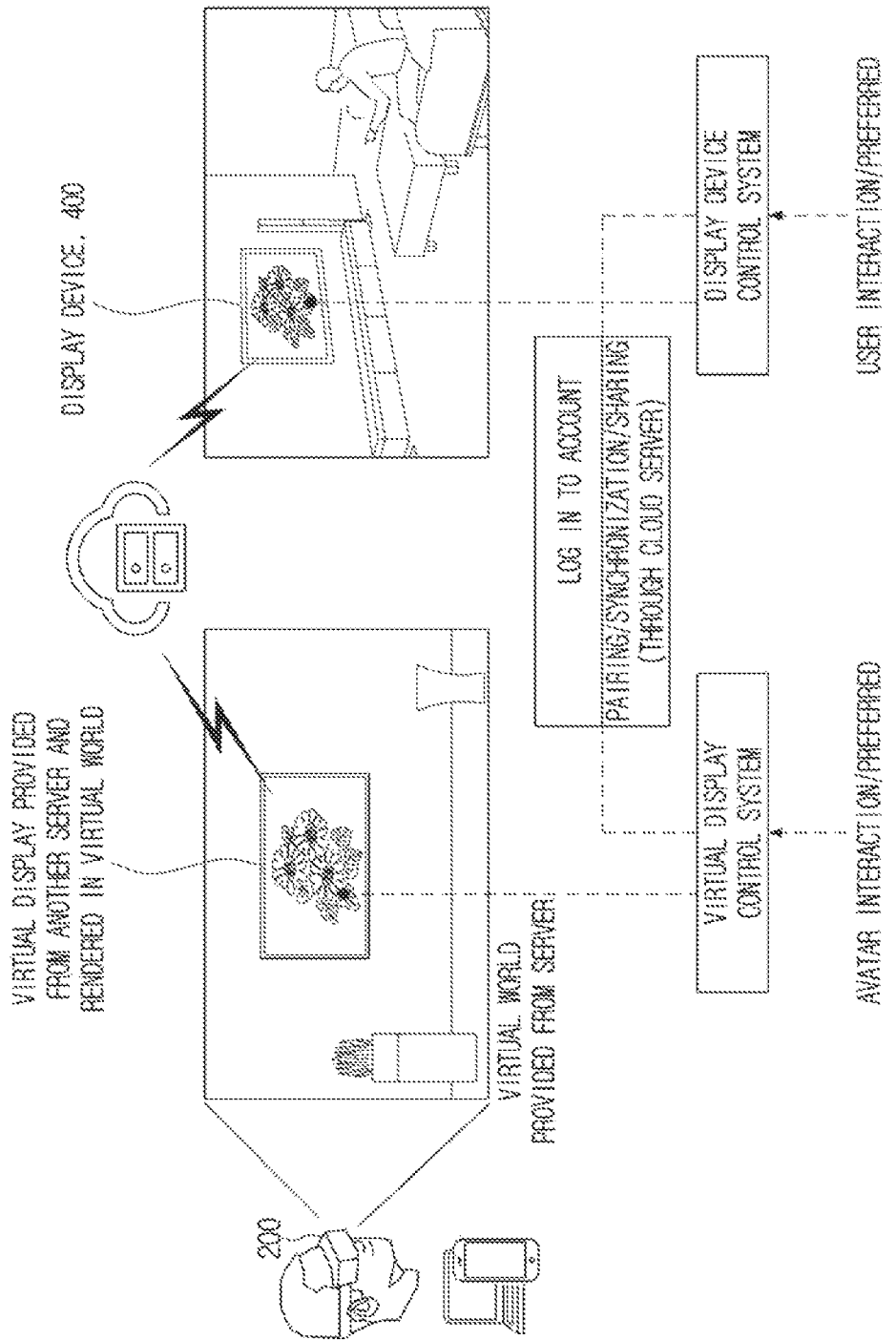
FIG. 5 is a diagram for describing interworking between a virtual display device and a display device 400 according to an embodiment.

FIG. 5 is a diagram for describing interworking between a virtual display device and a display device 400 according to an embodiment.

As shown in FIG. 5, a user terminal device 200 may be embodied as an HMD device, and a user may view an image including a virtual display device. The virtual display device may interwork with a screen of a display device 400 of the real world shown in a left part of FIG. 5.

Here, the processor 120 may allow the virtual display device and the display device 400 to interwork through the user's authentication information. For example, when the user performs authentication through the user terminal device 200, the processor 120 may receive authentication information from the user terminal device 200 and identify the user of the user terminal device 200. In addition, when a user performs authentication through the display device 400, the processor 120 may receive authentication information from the display device 400 and identify the user of the display device 400. The processor 120 may allow the virtual display device and the display device 400 to interwork when the user of the user terminal device 200 and the user of the display device 400 are the same. Here, the interworking may include synchronization, pairing, sharing, etc. of content.

When there are a plurality of authenticated display devices, the processor 120 may render a virtual world image on which a UI for selecting a display device to interwork from among the plurality of display devices is displayed through the virtual display device.

When the virtual display device and the display device 400 interwork through the authentication, the virtual display device may not be turned off even when the display device 400 is powered off.

A user may control the virtual display device by controlling an avatar in the virtual world. For example, the avatar may turn off the virtual display device and, in this case, the processor 120 may transmit a control command to turn off the display device 400 to the display device 400 through the communication interface 110. That is, the user may control the virtual display device using the avatar to control attributes, functions, applications, settings, etc., of the display device 400 of the real world.

Alternatively, the user may control the display device 400 of the real world to control attributes, functions, applications, settings, etc., of the virtual display device. That is, when the user controls the display device 400, the display device 400 may transmit control information to the server 100, and the processor 120 may render a virtual world image including the virtual display device reflecting the control information and transmit the rendered virtual world image to the user terminal device 200.

Figure 7:
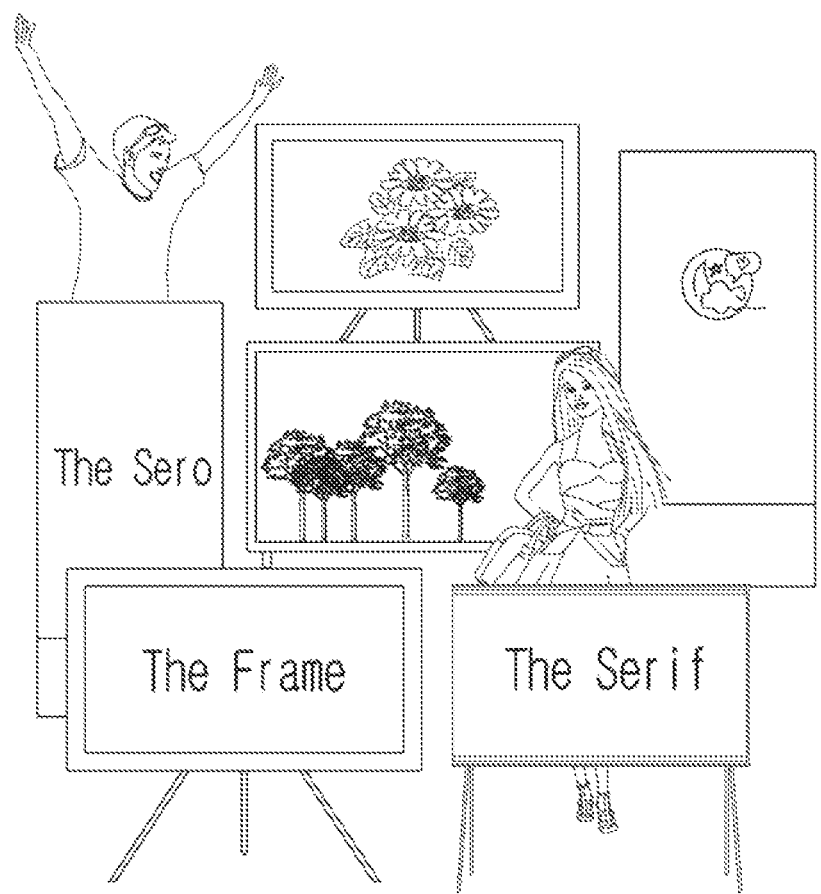

FIGS. 6 and 7 are diagrams illustrating various form factors of a virtual display device according to an embodiment.

The processor 120 may render a virtual world image including a virtual display device of various form factors. For example, as shown in FIGS. 6 and 7, the processor 120 may represent a virtual display device by various methods, e.g., a method of placing the virtual display device on an easel type holder, a method of hanging the virtual display device on a wall, a method of changing a form of a display, and a method of rotating a display.

The processor 120 may provide a variety of form factors and render a virtual world including a virtual display device using a form factor selected by a user. The processor 120 may determine a form factor on the basis of information about the display device 400 when a user command to select a form factor is not received. For example, the processor 120 may render a virtual world including a virtual display device of the same form factor as the display device 400.

Alternatively, the processor 120 may determine a form factor on the basis of the virtual world. For example, the processor 120 may render a virtual world including a virtual display device of the same form factor as the display device 400 when the virtual world is a home, and render a virtual world including a virtual display device corresponding to a wall size of a theater when the virtual world is the theater.

The processor 120 may change the form factor of the virtual display device when a command to change a form factor is received from a user. However, even when the form factor of the virtual display device is changed, a form factor of the display device 400 cannot be changed and thus the processor 120 does not transmit the command to change a form factor to the display device 400 even when this command is received. In addition, even when an avatar changes the size or position of the virtual display device, the processor 120 does not additionally transmit a command to the display device 400.

Figure 8:
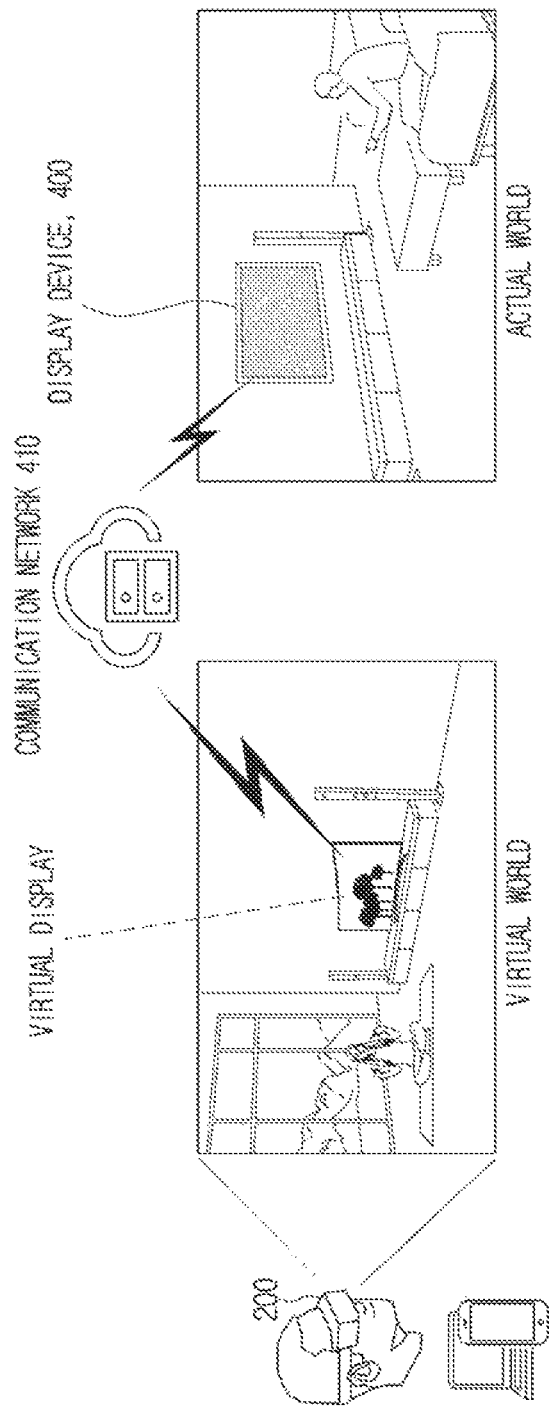
FIG. 8 is a diagram illustrating authentication and interworking according to an embodiment.

FIG. 8 is a diagram illustrating authentication and interworking according to an embodiment.

The processor 120 may render a virtual world image on which a UI for user authentication is displayed through a virtual display device. A display device 400 may display the UI for user authentication.

A user may perform user authentication through the virtual display device and the display device 400. An authentication process may include not only a process of providing a user's identification information but also a process of obtaining the user's permission and consent to control, transmit, and share information.

The processor 120 may identify a user of the user terminal device 200 when authentication information is received from the user terminal device 200. In addition, the processor 120 may identify the user of the display device 400 when the authentication information is received from the display device 400.

The processor 120 may identify the display device 400 as a device corresponding to the virtual display device when a first user command to add the virtual display device to a virtual world image is received in a state in which only one display device 400 has completed the authentication operation.

Alternatively, when the first user command to add the virtual display device to the virtual world image is received in a state in which a plurality of display devices have completed the authentication operation, the processor 120 may render a virtual world image on which a UI for inducing to select one of the plurality of display devices is displayed on the virtual display device and transmit the rendered virtual world image to the user terminal device 200. When a user command to select one display device is received from the user terminal device 200, the processor 120 may identify a display device corresponding to the user command as a device corresponding to the virtual display device.

When the virtual display device and the display device 400 interwork, the processor 120 may render a virtual world image on which a UI for inquiring about synchronization, sharing, control, adjustment, or the like, during the interworking is displayed through the virtual display device.

A user may select desired interwork through the UI. For example, the user may set the virtual display device and the display device 400 to display the same content through the UI.

Alternatively, the user may set the virtual display device to display content on the basis of a channel setting status of the display device 400. In this case, as shown in FIG. 8, the virtual display device may display content of channel 5, based on the channel setting status of the display device 400, e.g., a status in which channel 5 is set. In this case, the display device 400 may be turned off. That is, unlike a case in which the virtual display device is set to display the same content as the display device 400, the virtual display device reflects only the channel setting status of the display device 400 and thus may display content even when the display device 400 is turned off.

Figure 9:
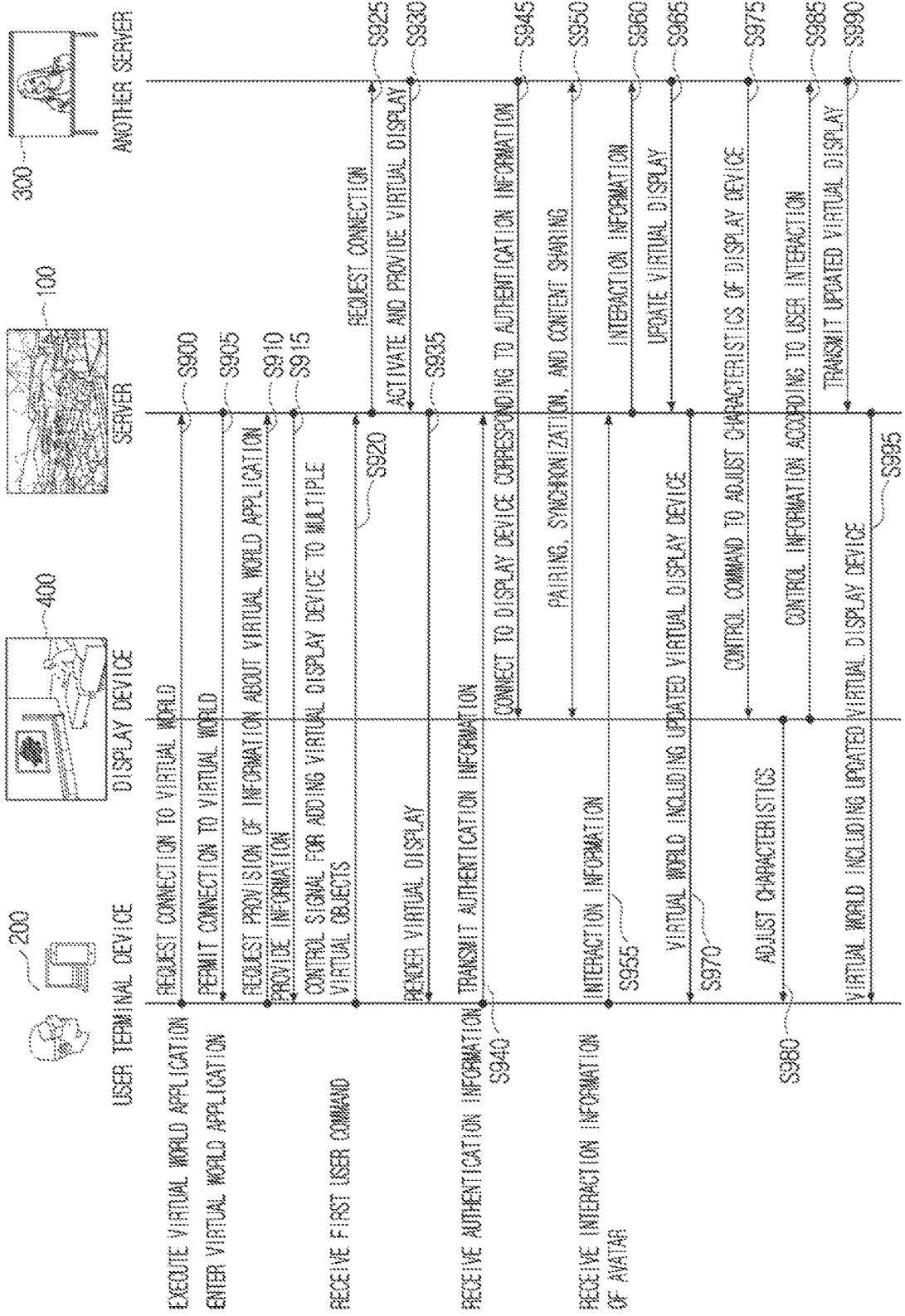
FIG. 9 is a sequence diagram illustrating an interworking operation according to an embodiment.

FIG. 9 is a sequence diagram illustrating an interworking operation according to an embodiment.

A user may execute a virtual world application through a user terminal device 200. The user terminal device 200 may transmit a request to connect to a virtual world to a server 100 when the virtual world application is executed (S900). The server 100 may transmit a permission to connect to the virtual world to the user terminal device 200 (S905).

When a user enters the virtual world application, the user terminal device 200 may request the server 100 to provide information about the virtual world application (S910). The server 100 may transmit the information about the virtual world application to the user terminal device 200 (S915). Here, the information about virtual world applications may include a rendered virtual world image.

When a first user command to add a virtual display device is received from a user, the user terminal device 200 may transmit a control signal for adding the virtual display device to a plurality of virtual objects to the server 100 (S920). When a control signal for adding a virtual display device is received, the server 100 may request connection to another server 300 (S925), and the other server 300 may activate a virtual display and provide the virtual display to the server 100 in response to the request from the server 100 (S930).

The server 100 may render a virtual world image including the virtual display device and provide the rendered virtual world image to the user terminal device 200 (S935), and when the user inputs authentication information through the virtual display device, the user terminal device 200 may transmit the authentication information to the server 100 (S940).

The other server 300 may be connected to a display device 400 corresponding to the authentication information (S945), and perform pairing, synchronization, content sharing, etc. (S950).

The user may perform various interactions in the virtual world using an avatar of the virtual world, the user terminal device 200 may transmit information regarding an interaction to the server 100 (S955), and the server 100 may transmit the information about the interaction to the other server 300 (S960).

The other server 300 may transmit the virtual display updated according to the interaction to the server 100 (S965), and the server 100 may render a virtual world image including the updated virtual display and provide the rendered virtual world image to the user terminal device 200 (S970).

In addition, the other server 300 may transmit to the display device 400 a control command to adjust characteristics of the display device 400 on the basis of the information about the interaction (S975), and the display device 400 may adjust the characteristics thereof on the basis of the control command (S980).

When a user interaction is received in the real world, the display device 400 may transmit control information according to the user interaction (S985), the other server 300 may transmit the virtual display updated based on the control information to the server 100 (S990), and the server 100 may render a virtual world including the updated virtual display and provide the rendered virtual world to the user terminal device 200 (S995).

As described above, the virtual display device and the display device 400 may interwork, and the user may control the display device 400 in the real world to control the virtual display device or control the virtual display device in the virtual world to control the display device 400.

Figure 10:
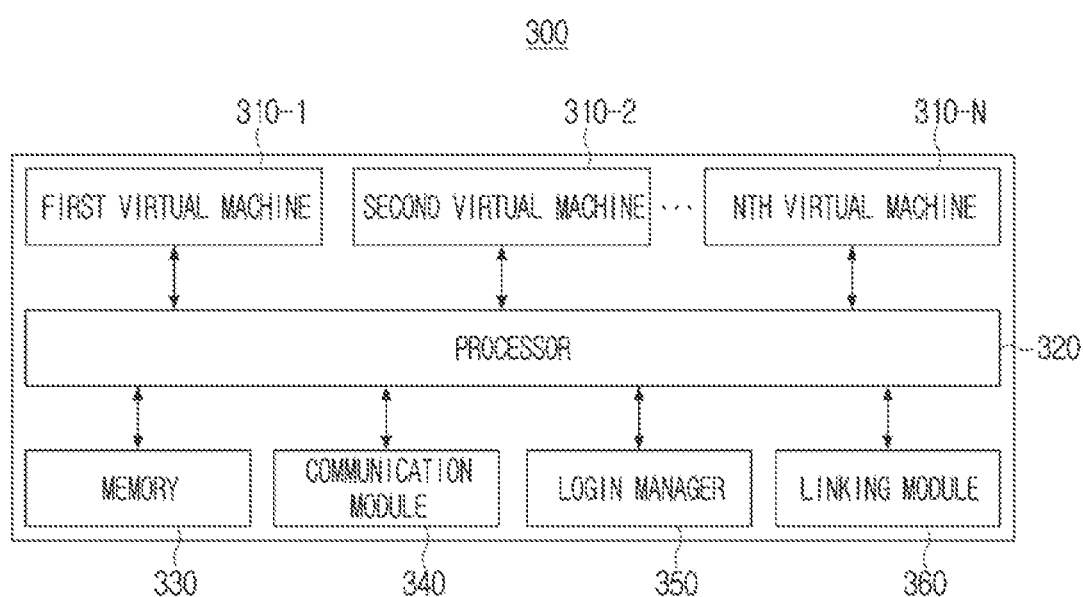
FIG. 10 is a diagram illustrating an operation of a server according to an embodiment.

FIG. 10 is a diagram illustrating an operation of another server 300 according to another embodiment.

As shown in FIG. 10, the other server 300 may include a plurality of virtual machines 310-1, 310-2, . . . , 310-N, a processor 320, a memory 330, a communication module 340, a login manager 350, and a linking module 360. Here, remaining components excluding the plurality of virtual machines 310-1, 310-2, . . . , 310-N are general components and thus only the plurality of virtual machines 310-1, 310-2, . . . , 310-N will be described below.

Each of the plurality of virtual machines 310-1, 310-2, . . . , 310-N may be a virtual machine that implements a virtual display. For example, the first virtual machine 310-1 may implement a first virtual display to be provided to a first user terminal device, and the second virtual machine 310-2 may implement a second virtual display to be provided to a second user terminal device. In this case, the first virtual display may interwork with a first display device of a user of the first user device, and the second virtual display may interwork with a second display device of a user of the second user device.

Alternatively, the first virtual machine 310-1 and the second virtual machine 310-2 may respectively implement a first virtual display and a second virtual display to be provided to the user terminal device 200. In this case, the first virtual display may interwork with the first display device of the user of the user terminal device 200, and the second virtual display may interwork with the second display device of the user of the user terminal device 200.

That is, the other server 300 may provide at least one virtual display to at least one user terminal device through a plurality of virtual machines.

Figure 11A:
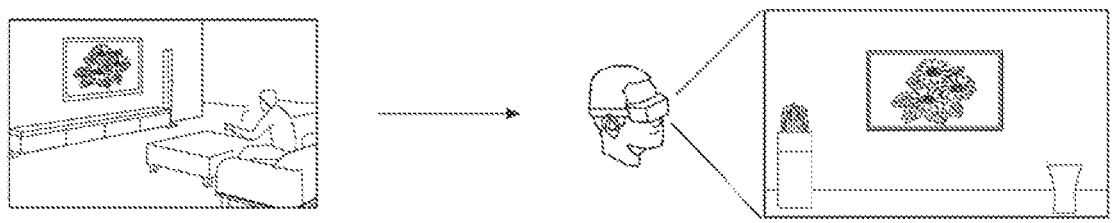
FIGS. 11A and 11B are diagrams illustrating a standby mode according to an embodiment.
Figure 11B:
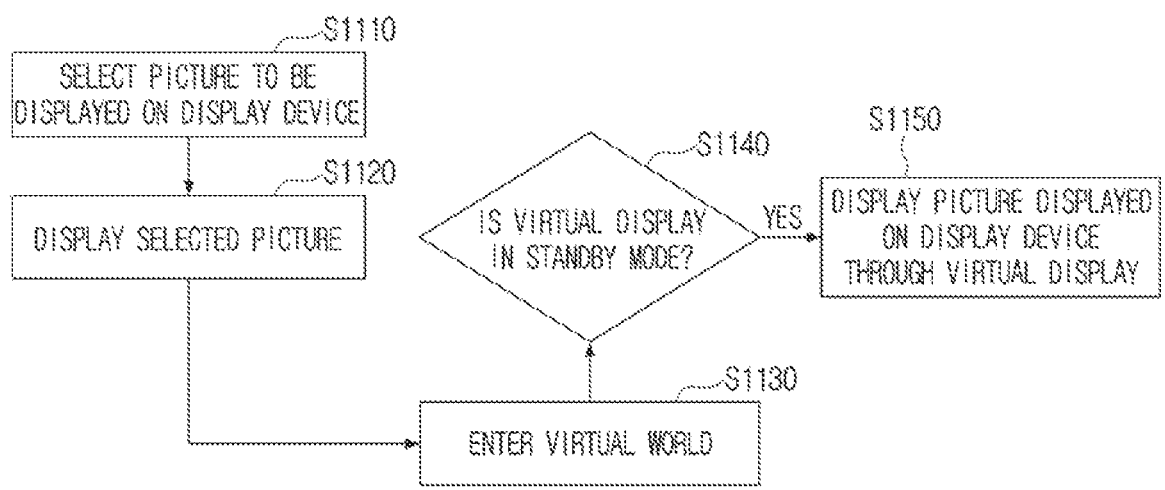

FIGS. 11A and 11B are diagrams illustrating a standby mode (e.g., a frame art mode or an ambient mode) according to an embodiment.

As illustrated in FIG. 11B, a user may select a picture to be displayed on the display device 400 in the real world (S1110). The display device 400 may display the picture selected by the user (S1120).

Thereafter, the user may enter a virtual world (S1130), and when a mode of a virtual display device is a standby mode (S1140-Y), the processor 120 may render a virtual world image on which the picture displayed on the display device 400 is displayed on the virtual display device and provide the rendered virtual world image to the user terminal device 200 (S1150).

In this case, the processor 120 may use the user's authentication information. For example, the processor 120 may identify the display device 400 on the basis of authentication information received through the user terminal device 200, and render a virtual world image on which the picture displayed on the display device 400 is displayed through the virtual display device.

Alternatively, the processor 120 may identify a laptop computer, a smart phone and the display device 400, based on the authentication information received through the user terminal device 200. In this case, the processor 120 may render a virtual world image on which a UI for requesting one of the three devices to be selected is displayed on the virtual display device. When a user command to select one of the three devices is received from the user terminal device 200, the processor 120 may render a virtual world image on which content displayed on the selected device is displayed through the virtual display device.

Figure 12A:
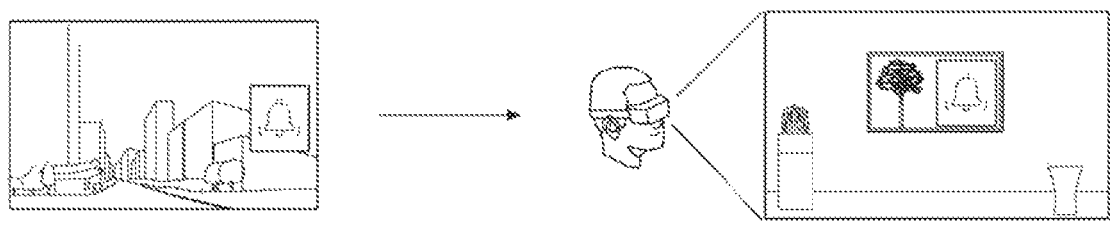
FIGS. 12A and 12B are diagrams illustrating linking only some functions according to an embodiment.
Figure 12B:
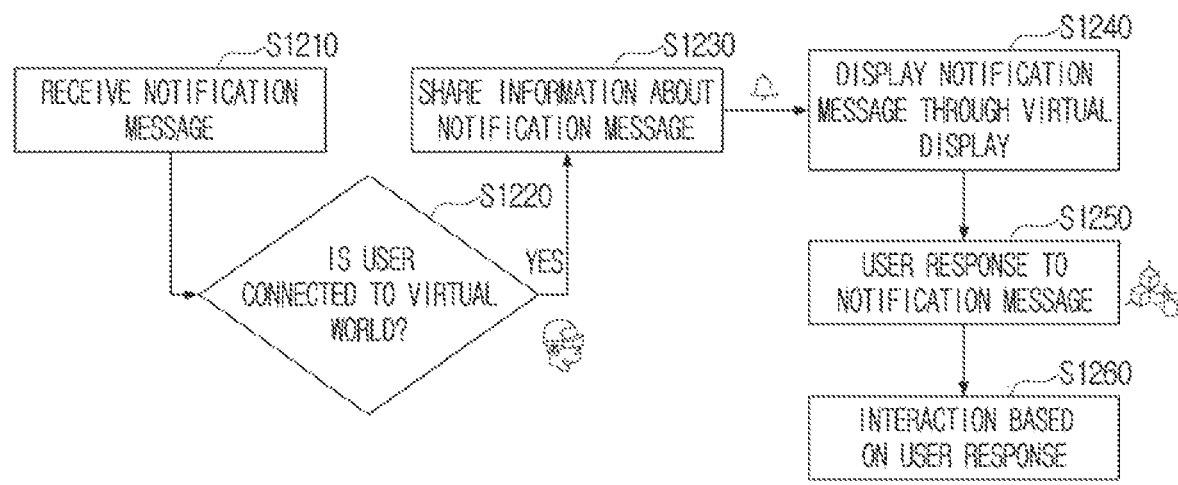

FIGS. 12A and 12B are diagrams illustrating linking only some functions according to an embodiment.

As illustrated in FIG. 12B, the display device 400 may receive a notification message (S1210). When the notification message is received, the display device 400 may identify whether a user is connected to a virtual world (S1220).

When it is identified that the user is connected to the virtual world, the display device 400 may share information about the notification message (S1230). For example, when it is identified that the user is connected to the virtual world, the display device 400 may transmit the information about the notification message to the other server 300 and the other server 300 may transmit the information about the notification message to the server 100.

The server 100 may render a virtual world image on which the notification message is displayed through the virtual display device and provide the rendered virtual world image to the user terminal device 200 (S1240).

When the user provides a response to the notification message through the virtual display device (S1250), a message of the response may be provided to the display device 400 through the user terminal device 200, the server 100 and the other server 300 (S1260).

Figure 13A:
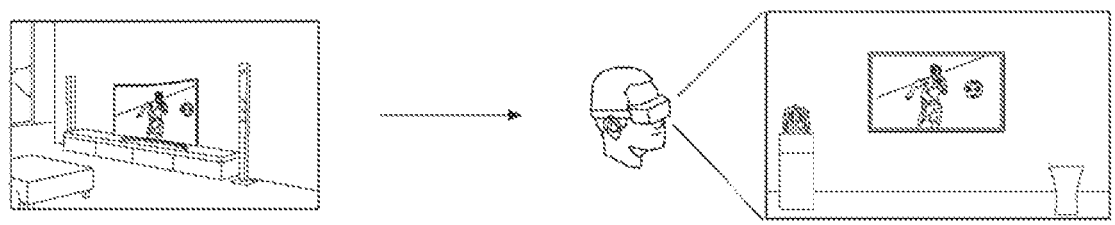
FIGS. 13A and 13B are diagrams illustrating an operation of providing content seamlessly according to an embodiment.
Figure 13B:
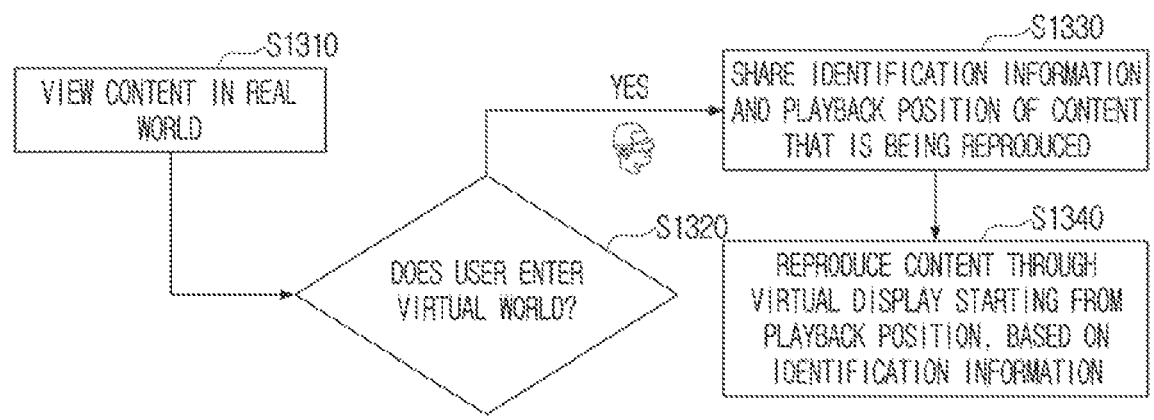

FIGS. 13A and 13B are diagrams illustrating an operation of providing content seamlessly according to an embodiment.

As illustrated in FIG. 13B, a user may view content through the display device 400 in the real world (S1310).

Thereafter, the user may enter the virtual world through the user terminal device 200 (S1320-Y), and in this case, the display device 400 provides the server 100 with identification information and a playback position of content, which is being reproduced, through the other server 300 (S1330) and the server 100 may render a virtual world image that reproduces the content starting from the playback position, based on the identification information (S1340).

Figure 14:
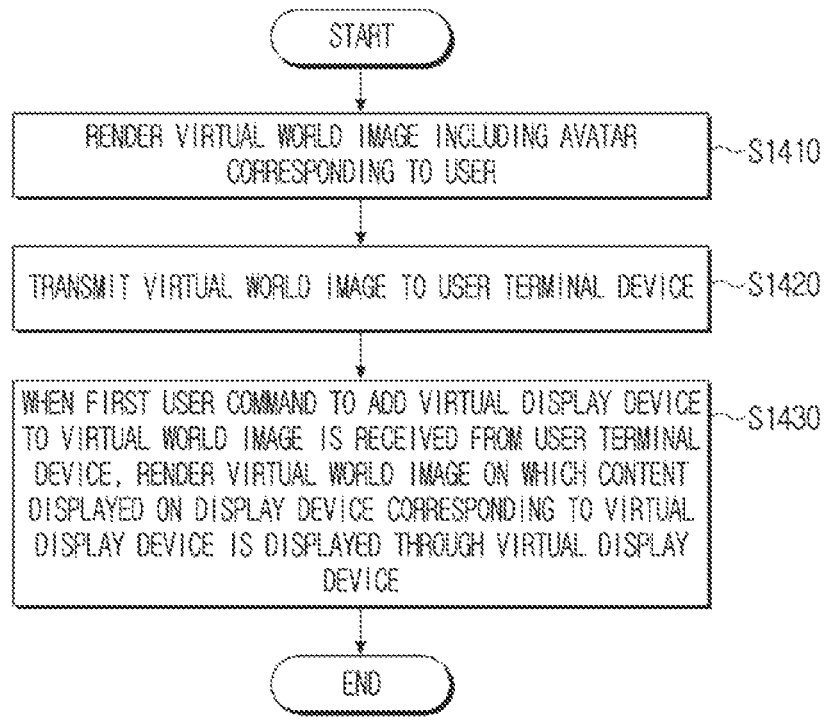
FIG. 14 is a flowchart of a control method of a server according to an embodiment.

FIG. 14 is a flowchart of a control method of a server according to an embodiment.

First, a virtual world image including an avatar corresponding to a user is rendered (S1410). Next, the virtual world image is transmitted to a user terminal device (S1420). When a first user command to add a virtual display device to the virtual world image is received from the user terminal device, a virtual world image on which content displayed on a display device corresponding to the virtual display device is displayed through the virtual display device is rendered (S1430).

Here, when a second user command of an avatar in relation to the virtual display device is received from the user terminal device, the control method may further include controlling an operation of the virtual display device on the basis of the second user command and transmitting a control command corresponding to the second user command to the display device.

In the rendering of the virtual world image (S1430), when the operation of the display device is changed and information about the changed operation is received from the display device, a virtual world image may be rendered based on the information about the changed operation.

In addition, in the rendering of the virtual display device (S1430), when the first user command and the authentication information are received from the user terminal device, a display device corresponding to the virtual display device may be identified on the basis of the authentication information.

In the rendering of the virtual display device (S1430), when a third user command to display other content is received from the user terminal device, a virtual world image on which the other content is displayed through the virtual display device may be rendered and a control signal for controlling the display device to display the other content may be transmitted to the display device, and when a command to stop sharing content and the third user command are received from the user terminal device, a virtual world image on which the other content is displayed through the virtual display device may be rendered.

Here, when a notification message is displayed on the display device while content is displayed on the display device and the other content is displayed on the virtual display device, the control method may further include rendering a virtual world image on which the other content overlaid with the notification message is displayed through the virtual display device.

In the rendering of the virtual display device (S1430), when a fourth user command to change a content playback mode between the user terminal device and the display device is received from the user terminal device, a virtual world image may be rendered based on a usage state of the user terminal device.

Here, in the rendering of the virtual display device (S1430), a virtual world image may be rendered and transmitted to the user terminal device when it is determined that the user terminal device is in use by a user, and the rendering of the virtual world image may be stopped when it is determined that the user terminal device is not in use by the user.

When it is determined that the user terminal device is in use by the user while the rendering of the virtual world image is stopped, the control method may further include receiving identification information and a playback position of the content from the display device and rendering a virtual world image by reproducing the content starting from the playback position, based on the identification information.

Here, when the identification information and the playback position are received, the control method may further include transmitting a control signal for turning off the display device to the display device.

In the rendering of the virtual display device (S1430), information about the virtual display device displaying the content may be received from the other server, and a virtual world image including the virtual display device may be rendered based on the received information.

According to various embodiments of the disclosure as described above, a server renders a virtual world image on which content displayed on a display device in the real world is displayed through a virtual display device according to a user command to add the virtual display device, and provides the rendered virtual world image to a user, thereby achieving an effect that gives the user a feeling of viewing the content through the display device of the real world even in a virtual world.

The server may control the display device of the real world according to a user command to control the virtual display device in the virtual world, thereby increasing user convenience.

In addition, the server may seamlessly provide content between the display device of the real world and the virtual display device according to an operating mode, thereby improving user convenience.

According to an embodiment, the various embodiments described above may be implemented as software including instructions stored in a machine-readable storage media that are readable by a machine (e.g., a computer). The machine is a device capable of calling an instruction stored in a storage medium and operating according to the called instruction and may include an electronic device (e.g., an electronic device A) according to the embodiments set forth herein. When an instruction is executed by a processor, a function corresponding to the command may be executed directly by the processor or executed using other components under control of the processor. The instruction may include code generated or executable by a compiler or interpreter. The machine-readable storage media may be provided as non-transitory storage media. Here, the term "non-temporary" means that the storage medium does not include a signal and is tangible but does not indicate whether data is stored in the storage medium semi-permanently or temporarily.

In an embodiment, methods according to various embodiments of the disclosure as described above may be provided by being included in a computer program product. The computer program product may be traded as a product between a seller and a purchaser. The computer program product may be distributed in the form of a machine-readable storage medium (e.g., compact disc read-only memory (CD-ROM)) or may be distributed online through an application store (e.g., Play Store™). When distributed online, at least some of the computer program product may be temporarily stored or generated in a storage medium such as server of a manufacturer, a server of an application store, or a memory of a relay server.

Various embodiments of the disclosure as described above may be implemented in a recording medium readable by a computer, or the like, using software, hardware or a combination thereof. In some cases, the embodiments described herein may be implemented as a processor. According to software implementation, the embodiments of the procedures and functions described herein can be implemented as separate software modules. Each of the software modules may perform one or more of the functions and operations described herein.

Computer instructions for performing a processing operation of a machine according to the various embodiments described above may be stored in a non-transitory computer-readable medium. A processing operation of a machine according to the various embodiments described above is performed by a certain machine when the computer instructions stored in the non-transitory computer-readable medium are executed by a processor of the machine. The non-transitory computer-readable medium should be understood to mean a medium that stores data semi-permanently and that is readable by a machine rather than a medium, e.g., a register, a cache or a memory, that stores data for a short time. Examples of the non-transitory computer-readable medium may include a CD, a DVD, a hard disc, a Blu-ray disc, a USB, a memory card, and a ROM.

Each of the components (e.g., modules or programs) according to the various embodiments described above may include a single or multiple entities, and some of the sub-components described above may be omitted or other sub-components may be further included in various embodiments. Generally or additionally, some components (e.g., modules or programs) may be integrated into one entity that performs functions performed by the components in the same or similar way. According to various embodiments, operations may be performed by modules, programs or other components in a sequential, parallel, repetitive, or heuristic manner, at least some of the operations may be performed in a different order or omitted or other operations may be added.

Although embodiments of the disclosure have been illustrated and described herein, the disclosure is not limited thereto, and various modifications may be made by those of ordinary skill in the art without departing from the gist of the disclosure defined in the appended claims and should not be understood separately from the technical idea or prospect of the disclosure.

What is claimed is:

1. A control method of a server, the control method comprising:
    rendering a virtual world image including an avatar corresponding to a user;
    transmitting the virtual world image to a user terminal device; and
    based on receiving, from the user terminal device, a first user command to add a virtual display device to the virtual world image, rendering the virtual world image on which content displayed on a display device corresponding to the virtual display device is displayed through the virtual display device,
    wherein the virtual display device is on at a same time the display device is powered off.

2. The control method of claim 1, further comprising:
    based on receiving, from the user terminal device, a second user command of the avatar in relation to the virtual display device, controlling an operation of the virtual display device based on the second user command and transmitting a control command corresponding to the second user command to the display device.

3. The control method of claim 1, wherein the rendering of the virtual world image on which the content displayed on the display device corresponding to the virtual display device is displayed through the virtual display device comprises:
    based on an operation of the display device being changed and receiving information about the changed operation from the display device, rendering the virtual world image based on the information about the changed operation.

4. The control method of claim 1, wherein the rendering of the virtual world image on which the content displayed on the display device corresponding to the virtual display device is displayed through the virtual display device comprises: based on the first user command and authentication information being received from the user terminal device, identifying the display device corresponding to the virtual display device based on the authentication information.

5. A non-transitory computer readable storage medium having instructions stored thereon which, when executed by a processor of a server, cause the processor to:
    render a virtual world image including an avatar corresponding to a user;
    transmit the virtual world image to a user terminal device through a communication interface;
    based on receiving, from the user terminal device through the communication interface, a first user command to add a virtual display device to the virtual world image render the virtual world image on which content displayed on a display device corresponding to the virtual display device is displayed through the virtual display device,
    wherein the virtual display device is on at a same time the display device is powered off.

6. The non-transitory computer readable storage medium of claim 5, which further causes the processor to:
    based on receiving, from the user terminal device through the communication interface, a second user command of the avatar in relation to the virtual display device, control an operation of the virtual display device and transmit a control command corresponding to the second user command to the display device through the communication interface, based on the second user command.

7. The non-transitory computer readable storage medium of claim 5, which further causes the processor to:
    based on an operation of the display device being changed and receiving information about the changed operation from the display device through the communication interface, render the virtual world image based on the information about the changed operation.

8. The non-transitory computer readable storage medium of claim 5, which further causes the processor to:
    based on the first user command and authentication information being received from the user terminal device through the communication interface, identify the display device corresponding to the virtual display device, based on the authentication information.

9. The non-transitory computer readable storage medium of claim 5, which further causes the processor to:
    based on receiving a third user command to display other content from the user terminal device through the communication interface, render the virtual world image on which the other content is displayed through the virtual display device, and transmit a control signal for controlling the display device to display the other content to the display device through the communication interface; and based on receiving a command to stop sharing content and the third user command from the user terminal device through the communication interface, render the virtual world image on which the other content is displayed through the virtual display device.

10. A server comprising:
a communication interface; and
a processor configured to:
  render a virtual world image including an avatar corresponding to a user,
  transmit the virtual world image to a user terminal device through the communication interface,
  based on receiving, from the user terminal device through the communication interface, a first user command to add a virtual display device to the virtual world image, render the virtual world image on which content displayed on a display device corresponding to the virtual display device is displayed through the virtual display device,
  wherein the virtual display device is on at a same time the display device is powered off.

11. The server of claim 10, wherein the processor is further configured to, based on receiving, from the user terminal device through the communication interface, a second user command of the avatar in relation to the virtual display device, control an operation of the virtual display device and transmit a control command corresponding to the second user command to the display device through the communication interface, based on the second user command.

12. The server of claim 10, wherein the processor is further configured to, based on an operation of the display device being changed and receiving information about the changed operation from the display device through the communication interface, render the virtual world image based on the information about the changed operation.

13. The server of claim 10, wherein the processor is further configured to, based on the first user command and authentication information being received from the user terminal device through the communication interface, identify the display device corresponding to the virtual display device, based on the authentication information.

14. The server of claim 10, wherein the processor is further configured to:
based on receiving a third user command to display other content from the user terminal device through the communication interface, render the virtual world image on which the other content is displayed through the virtual display device, and transmit a control signal for controlling the display device to display the other content to the display device through the communication interface; and based on receiving a command to stop sharing content and the third user command from the user terminal device through the communication interface, render the virtual world image on which the other content is displayed through the virtual display device.

15. The server of claim 14, wherein the processor is further configured to, based on a notification message being displayed on the display device while the content is displayed on the display device and the other content is displayed on the virtual display device, render the virtual world image on which the other content is overlaid with the notification message is displayed through the virtual display device.

16. The server of claim 10, wherein the processor is further configured to, based on receiving, from the user terminal device through the communication interface, a fourth user command to change a content playback mode between the user terminal device and the display device, render the virtual world image, based on a usage state of the user terminal device.

17. The server of claim 16, wherein the processor is further configured to:
  render the virtual world image and provide the rendered virtual world image to the user terminal device through the communication interface based on determining that the user terminal device is in use by the user; and
  stop the rendering of the virtual world image based on determining that the user terminal device is not in use by the user.

18. The server of claim 17, wherein the processor is further configured to:
  receive identification information and a playback position of the content based on determining that the user terminal device is in use by the user in a state in which the rendering of the virtual world image is stopped; and
  reproduce the content starting from the playback position, based on the identification information.

19. The server of claim 18, wherein the processor is further configured to, based on receiving the identification information and the playback position, transmit a control signal for turning off the display device to the display device through the communication interface.

20. The server of claim 10, wherein the processor is further configured to:
  receive, from another server through the communication interface, information about the virtual display device on which the content is displayed; and
  render the virtual world image including the virtual display device, based on the received information.

* * * * *